(12) United States Patent
Djordjev

(10) Patent No.: US 7,688,452 B2
(45) Date of Patent: Mar. 30, 2010

(54) DETERMINATION OF INTERFEROMETRIC MODULATOR MIRROR CURVATURE AND AIRGAP VARIATION USING DIGITAL PHOTOGRAPHS

(75) Inventor: Kostadin Djordjev, San Jose, CA (US)

(73) Assignee: Qualcomm Mems Technologies, Inc., San Diego, CA (US)

( * ) Notice: Subject to any disclaimer, the term of this patent is extended or adjusted under 35 U.S.C. 154(b) by 44 days.

(21) Appl. No.: 12/116,704

(22) Filed: May 7, 2008

(65) Prior Publication Data
US 2009/0051925 A1 Feb. 26, 2009

Related U.S. Application Data

(63) Continuation of application No. 11/479,392, filed on Jun. 30, 2006, now Pat. No. 7,388,704.

(51) Int. Cl.
*G01B 11/02* (2006.01)
*G02B 26/00* (2006.01)

(52) U.S. Cl. ................................. 356/506; 359/290

(58) Field of Classification Search ......... 359/247, 359/290, 291, 302, 317; 356/454, 506, 519
See application file for complete search history.

(56) References Cited

U.S. PATENT DOCUMENTS

| 3,359,852 | A | 12/1967 | Wilczynski et al. |
| 5,175,772 | A | 12/1992 | Kahn et al. |
| 5,559,358 | A | 9/1996 | Burns et al. |
| 6,034,480 | A | 3/2000 | Browning et al. |
| 6,040,937 | A | 3/2000 | Miles |
| RE37,847 | E | 9/2002 | Henley et al. |
| 6,567,715 | B1 | 5/2003 | Sinclair et al. |
| 6,657,218 | B2 | 12/2003 | Noda |
| 6,674,090 | B1 | 1/2004 | Chua et al. |
| 6,674,562 | B1 | 1/2004 | Miles |
| 6,734,977 | B2 * | 5/2004 | Noda ................. 356/504 |
| 6,777,249 | B2 | 8/2004 | Yamazaki |
| 6,950,193 | B1 | 9/2005 | Discenzo |
| 7,123,216 | B1 | 10/2006 | Miles |
| 7,126,741 | B2 | 10/2006 | Wagner et al. |
| 7,187,489 | B2 | 3/2007 | Miles |
| 7,289,256 | B2 | 10/2007 | Cummings et al. |

(Continued)

OTHER PUBLICATIONS

Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).

(Continued)

*Primary Examiner*—William C Choi
(74) *Attorney, Agent, or Firm*—Knobbe Martens Olson & Bear LLP

(57) ABSTRACT

Air gap variation in an interferometric modulator over a two-dimensional spatial map of the modulator is determined by acquiring a digital photograph of the modulator. Color parameters of individual pixels in the photograph are determined and compared to a model of color parameters as a function of air gap distance. The model and individual pixel color parameters may be plotted on a color space plot for comparison. The determined distances may be plotted over a two-dimensional spatial map of the interferometric modulator to visualize the mirror curvature and air gap variation.

14 Claims, 11 Drawing Sheets

U.S. PATENT DOCUMENTS

| | | | |
|---|---|---|---|
| 7,327,510 | B2 | 2/2008 | Cummings et al. |
| 7,359,066 | B2 | 4/2008 | Cummings et al. |
| 7,388,704 | B2 | 6/2008 | Djordjev |
| 7,415,186 | B2 | 8/2008 | Cummings et al. |
| 7,417,735 | B2 | 8/2008 | Cummings et al. |
| 2002/0157033 | A1 | 10/2002 | Cox |
| 2006/0077401 | A1 | 4/2006 | Kothari et al. |
| 2006/0103643 | A1 | 5/2006 | Mathew et al. |
| 2007/0194414 | A1 | 8/2007 | Chou |
| 2008/0088638 | A9 | 4/2008 | Miles |
| 2008/0180680 | A1 | 7/2008 | Cummings et al. |
| 2008/0303531 | A1 | 12/2008 | Cummings et al. |

OTHER PUBLICATIONS

Aratani et al., "Surface Micromachined Tuneable Interferometer Array," Sensors and Actuators, pp. 17-23 (1994).

Conner, "Hybrid Color Display Using Optical Interference Filter Array," SID Digest, pp. 577-580 (1993).

Durr et al., "Reliability Test and Failure Analysis of Optical MEMS", Proceedings of the 9th International Symposium on the Physical and Failure Analysis of Integrated Circuits, pp. 201-206, (Jul. 8-12, 2002).

Raley et al., "A Fabry-Perot Microinterferometer for Visible Wavelengths," IEEE Solid-State Sensor and Actuator Workshop, Hilton Head, SC (1992).

Skaggs et al, "Automatic Testing of the Digital Micromirror Device", IEEE/LEOS 1996 Summer Topical Meetings, pp. 11-12, (Aug. 5-9, 1996).

Srikar et al., "A Critical Review of Microscale Mechanical Testing Methods Used in the Design of Microelectromechanical Systems," Society for Experimental mechanics, vol. 43, No. 3, (2003).

* cited by examiner

|  | Column Output Signals | |
|---|---|---|
|  | $+V_{bias}$ | $-V_{bias}$ |
| Row Output Signals   0 | Stable | Stable |
| $+\Delta V$ | Relax | Actuate |
| $-\Delta V$ | Actuate | Relax |

US 7,688,452 B2

DETERMINATION OF INTERFEROMETRIC MODULATOR MIRROR CURVATURE AND AIRGAP VARIATION USING DIGITAL PHOTOGRAPHS

CROSS-REFERENCE TO RELATED APPLICATIONS

This application is a continuation of and claims priority to U.S. patent application Ser. No. 11/479,392, filed Jun. 30, 2006, which is incorporated herein by reference in its entirety.

FIELD OF THE INVENTION

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY OF THE INVENTION

One embodiment disclosed herein includes a method that includes deriving a model that comprises color parameters as a function of distance between two mirrors in a Fabry-Perot interferometer, determining color parameters for light reflected from the Fabry-Perot interferometer at a particular location, and comparing the determined color parameters with the model to estimate the distance between the two mirrors in the Fabry-Perot interferometer at the particular location.

Another embodiment disclosed herein includes a method that includes determining color parameters for light reflected from a Fabry-Perot interferometer and determining, based upon the determined color parameters, a distance between two mirrors in the Fabry-Perot interferometer.

Another embodiment disclosed herein includes a test station for constructing a two-dimensional map of distances between two mirrors in an interferometric modulator where the station includes a digital photograph acquisition system configured to acquire a digital photograph of the interferometric modulator and a computer configured to determine color parameters for a plurality of regions in the digital photograph and compare the color parameters to a model in order to determine distances between the two mirrors for a plurality of locations in the interferometric modulator.

Another embodiment disclosed herein includes a test station for constructing a two-dimensional map of distances between two mirrors in an interferometric modulator where the station includes means for acquiring a digital photograph of the interferometric modulator and means for determining color parameters for a plurality of regions in the digital photograph and comparing the color parameters to a model in order to determine distances between the two mirrors for a plurality of locations in the interferometric modulator.

DETAILED DESCRIPTION OF THE PREFERRED EMBODIMENT

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

As noted above, the position of one reflective plate in relation to another in an interferometric modulator can change the optical interference of light incident on the interferometric modulator, and thus the color of light reflected from the interferometric modulator. If the distance between one plate and another varies, such as by one plate being slanted relative to the other or curved, the color reflected from the interferometric modulator will also vary across the structure. In many display implementations, it is desirable that the color reflected from an interferometric modulator be uniform to increase the color saturation and brightness of the display. Accordingly, some embodiments provide methods for constructing a two-dimensional spatial map of the distance between two reflective plates in an interferometric modulator across the structure. In some embodiments, this map is constructed by acquiring a digital photograph of the interferometric modulator and relating the color of each pixel in the photograph to a distance between the two plates.

Figure 1:
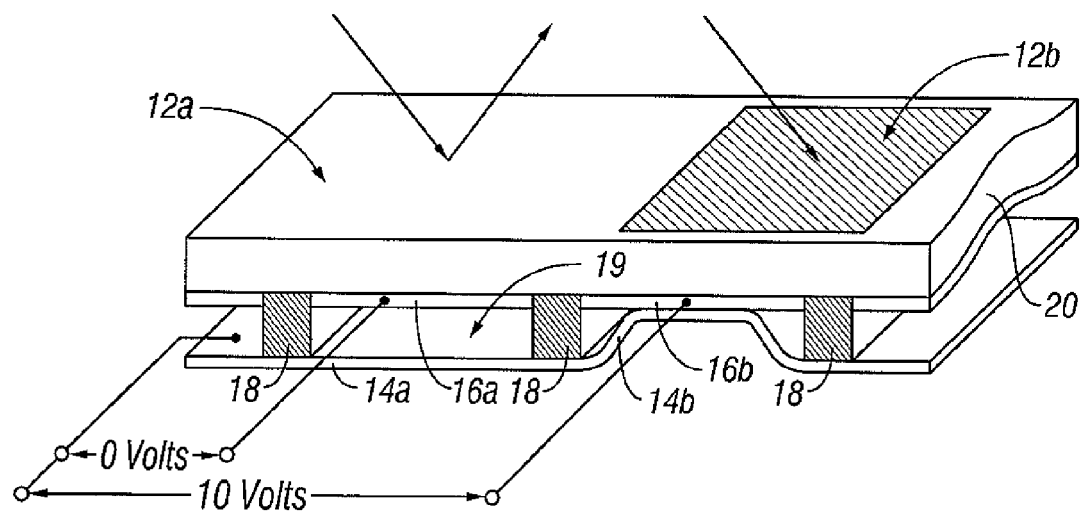
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the cavity 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5 illustrate one exemplary process and system for using an array of interferometric modulators in a display application.

Figure 2:
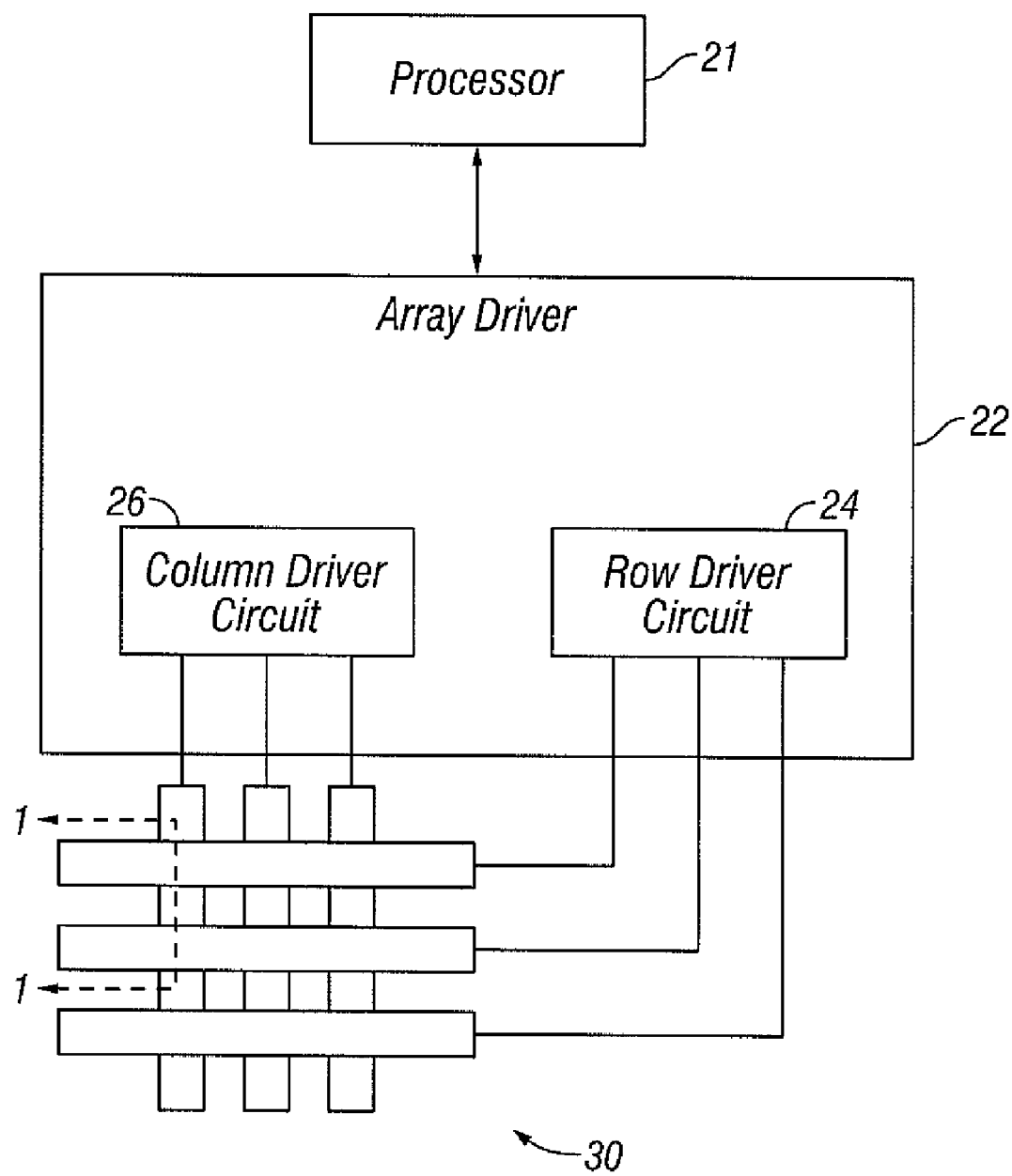
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
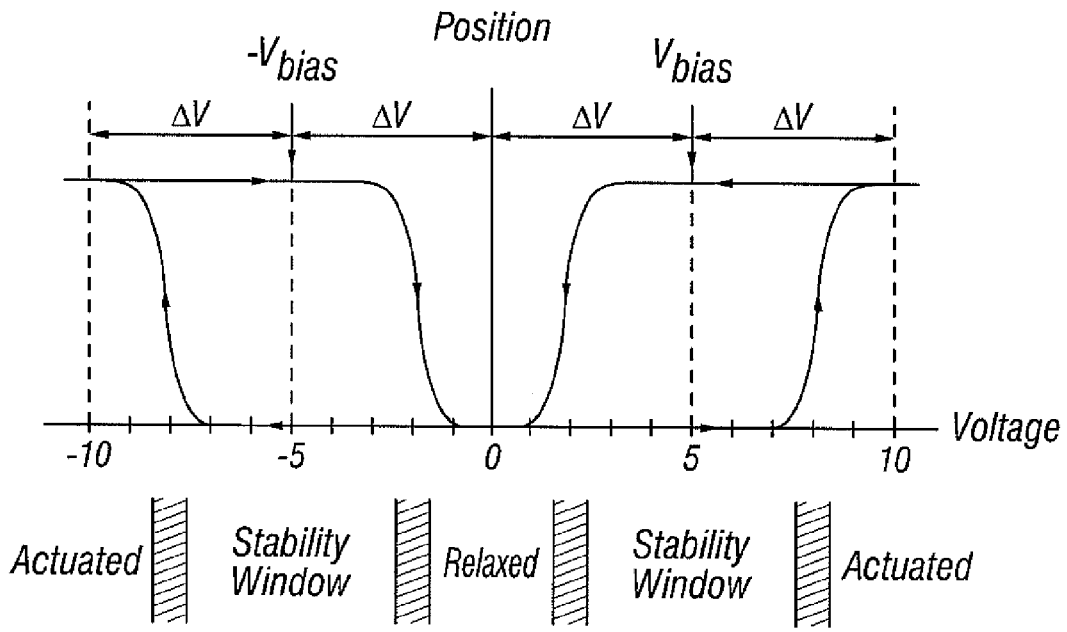
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
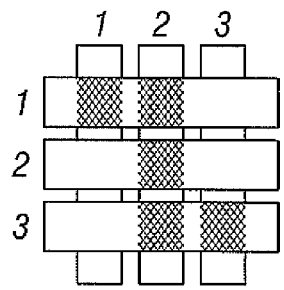
FIGS. 5A and 5B illustrate one exemplary timing diagram for row and column signals that may be used to write a frame of display data to the 3×3 interferometric modulator display of FIG. 2.
Figure 5B:
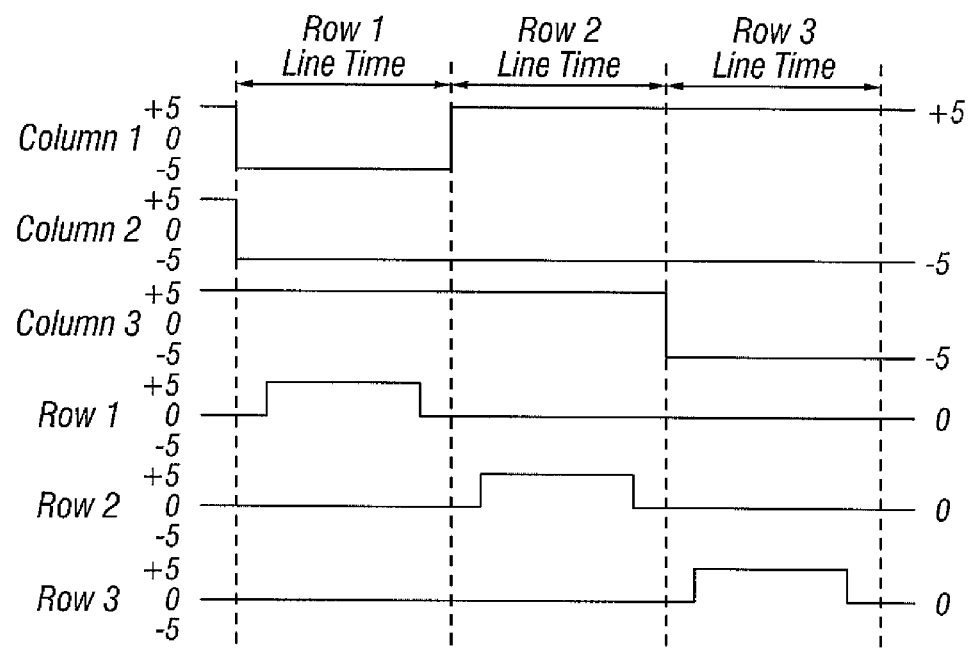

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
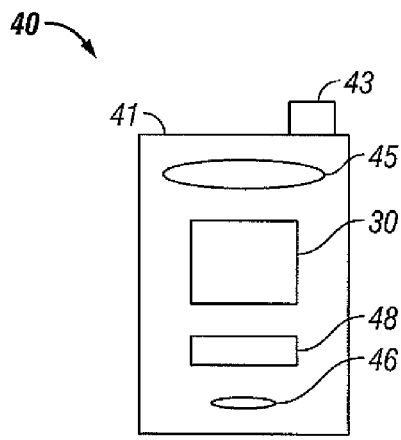
FIGS. 6A and 6B are system block diagrams illustrating an embodiment of a visual display device comprising a plurality of interferometric modulators.
Figure 6B:
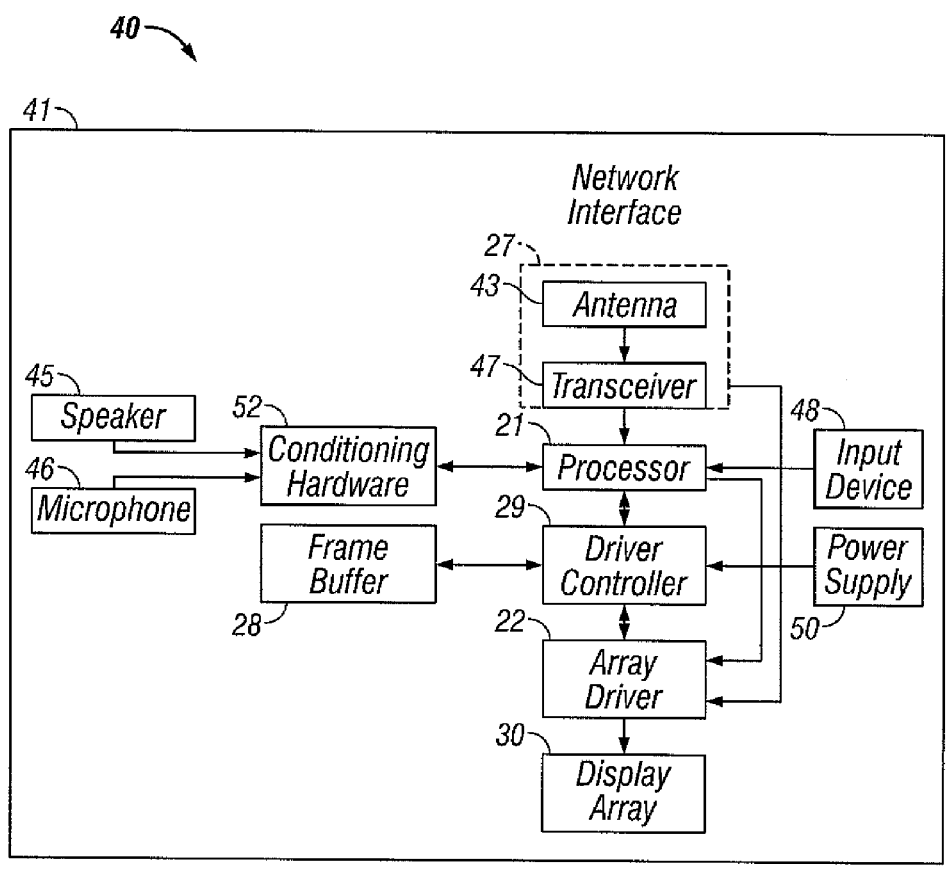

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 44, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22.

Those of skill in the art will recognize that the above-described optimization may be implemented in any number of hardware and/or software components and in various configurations.

Figure 7A:
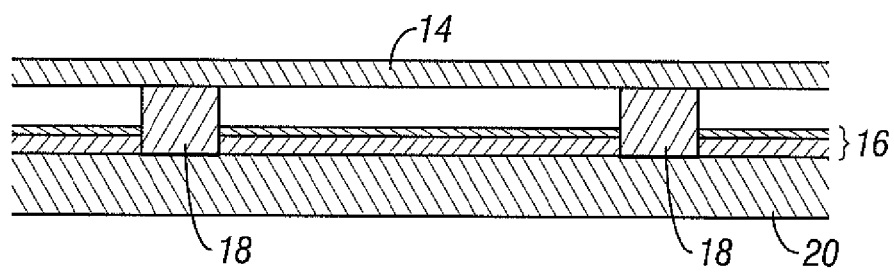
FIG. 7A is a cross section of the device of FIG. 1.
Figure 7B:
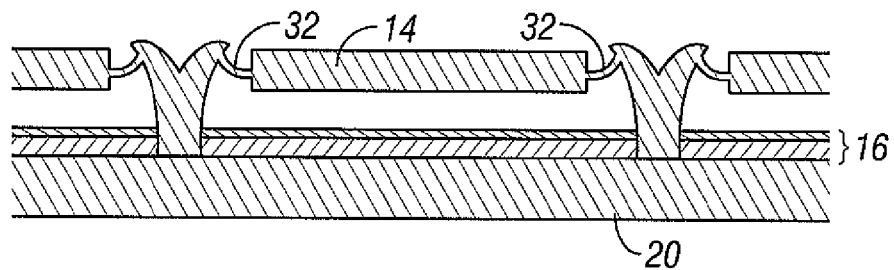
FIG. 7B is a cross section of an alternative embodiment of an interferometric modulator.
Figure 7C:
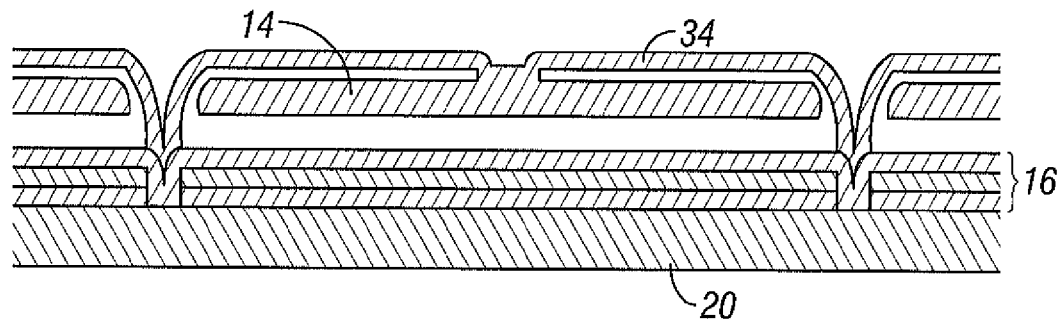
FIG. 7C is a cross section of another alternative embodiment of an interferometric modulator.
Figure 7D:
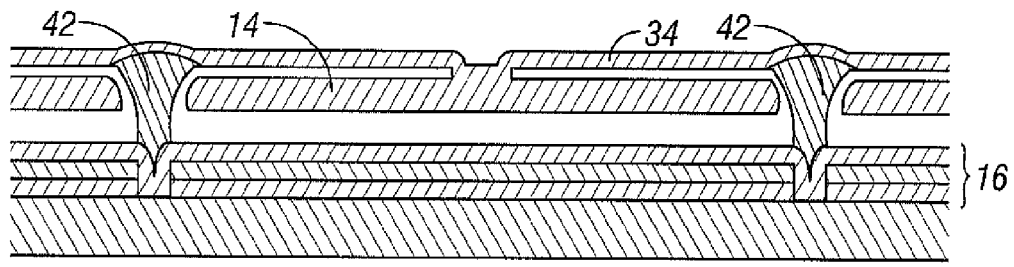
FIG. 7D is a cross section of yet another alternative embodiment of an interferometric modulator.
Figure 7E:
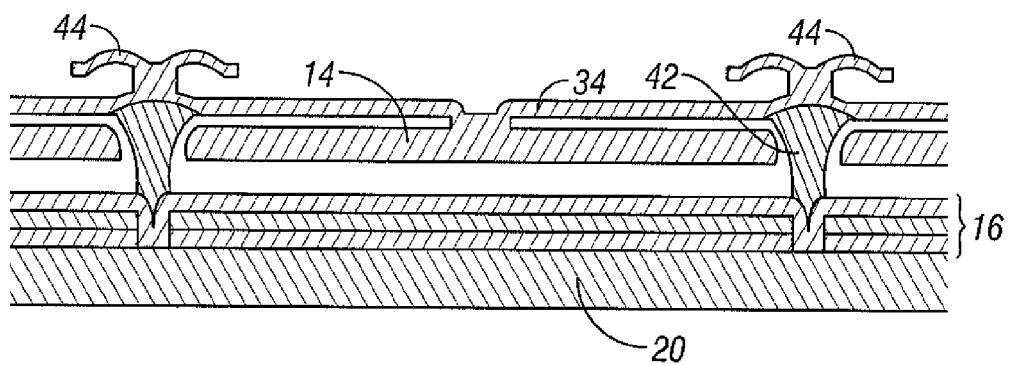
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the cavity, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

In one embodiment, methods are provided for obtaining a two-dimensional spatial map across one or more interferometric modulators of the distance between the movable reflective layer and the fixed partially reflective layer. Such a spatial map can provide information regarding the curvature and/or slantedness of the reflective layers. Thus, such maps can be used to monitor the success of various interferometric modulator manufacturing processes for producing flat parallel reflective layers. In addition, the maps can be used as a quality control measure to ensure that there has been no error during interferometric modulator manufacture.

Because the distance between the reflective layers at each point in an interferometric modulator determines the color of light reflected from that point, one method for determining distance is to measure the color of light reflected from the point. In one embodiment, this procedure is performed by obtaining spectra of reflected light for multiple points covering the two-dimensional surface of the interferometric modulator. Each spectrum can then be fit to a Fabry-Perot interferometer optical model to solve for the distance that would give the measured spectrum. It will be appreciated that this approach may be used for determining distances between reflective layers in any Fabry-Perot interferometer including interferometric modulators.

In an alternative method, a color digital photograph of an interferometric modulator may be acquired and the color of light reflected at various points across the interferometric modulator determined from the photograph. This method eliminates the need to make many separate spectral measurements of the interferometric modulator. Instead, a single photograph is acquired and a two-dimensional spatial map for each interferometric modulator in the photograph can be constructed using computer algorithms that compare the colors determined from the photograph with a model of how color varies with distance. In some embodiments, the colors in the model and the photograph are expressed in terms of color parameters.

Figure 8:
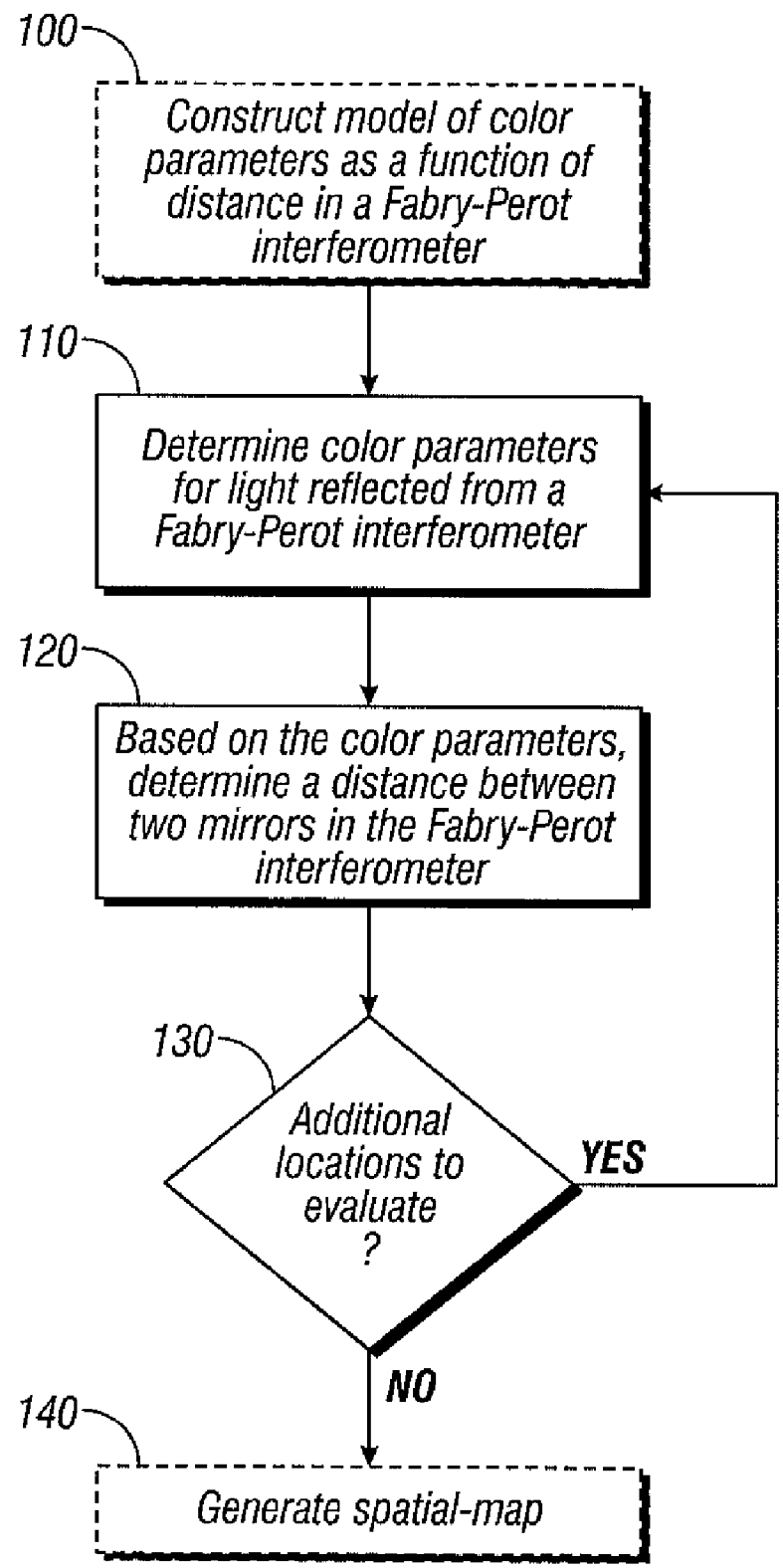
FIG. 8 is flowchart illustrating a method for determining distances between reflective layers in a Fabry-Perot interferometer.

Accordingly, as depicted in the flow chart in FIG. 8, one embodiment includes constructing a model of color parameter variation as a function of distance between two mirrors in a Fabry-Perot interferometer (block 100). Next, color parameters for light reflected from a Fabry-Perot interferometer (block 110) can be determined and then, based on the color parameters, a distance between two mirrors in the Fabry-Perot interferometer determined (block 120). This procedure may be repeated for a plurality of points across the Fabry-Perot interferometer in order to construct a two-dimensional spatial map of distances across the interferometer. Accordingly, at block 130, it is determined whether there are additional locations to evaluate (e.g., additional points in the photograph that have not yet been evaluated). If there are additional locations, the procedure returns to block 110. In this fashion, points in the photograph substantially covering the entire surface area of the Fabry-Perot interferometer may be evaluated. If all desired locations in the Fabry-Perot interferometer have been evaluated, a two-dimensional spatial map of the interferometer may be optionally constructed at block 140. Depending on the particular embodiment, steps may be added to those depicted in the flowcharts herein or some steps may be removed. In addition, the order of steps may be rearranged depending on the application.

In some embodiments, an interferometric modulator in a relaxed (bright) state is evaluated according the above procedures. When the interferometric modulator can also be actuated in an intermediate bright state (e.g., in a tri-state interferometric modulator), the actuated bright states can also be evaluated. In some embodiments, the measured bright states are driven bright states where a voltage waveform such as depicted in FIG. 5A is applied in such a fashion that none of the measured interferometric modulators change state. In some embodiments, two-dimensional spatial maps of interferometric modulators in undriven and driven bright states are obtained and compared.

In some embodiments, the model of color variation as a function of reflective layer distances is constructed (e.g., block 100 in FIG. 8) prior to analyzing a photograph of a Fabry-Perot interferometer (e.g., blocks 110-130 in FIG. 8). In other embodiments, a pre-existing model is used for the analysis. For example, a computer system may be provided to a user that has pre-stored one or more models where each model consists of a series of color parameter values related to a distance between mirror distances in a particular Fabry-Perot interferometer.

The model of color variation as a function of reflective layer distances in an interferometric modulator may be constructed by determining the color parameters predicted for a particular interferometric modulator using a Fabry-Perot optical model. Accordingly, one embodiment includes an algorithm that receives as input one or more properties of one or more materials in a Fabry-Perot interferometer and produces as output color parameters as a function of distance between two reflective layers in the Fabry-Perot interferometer (e.g., at block 100 of FIG. 8). The algorithm may be constructed using standard optical model principles of wavelength-dependent light reflection and transmission at each material interface, light absorption within each material, and interference between reflected rays of light. The algorithm may use these principles to determine a predicted spectrum of reflected light for a variety of distances between reflective layers. Each spectrum may then be converted to color parameters using known formulae. The properties that may be inputted into the algorithm may include, but are not limited to, the thickness of each material, the position of each material in the interferometer, the index of refraction for each material, and the extinction coefficient for each material. In some embodiments, some or all of these properties may be experimentally determined. For example, the thickness of each material deposited during a particular manufacturing process may be determined using known methods such as profilometry. The color parameters that are outputted may be any suitable color parameters such as CIE (Commission Internationale de l'Eclairage) standard (X, Y, Z) tristimulus values, (x, y) color parameters, or (u', v') color parameters. Those of skill in the art will appreciate that any numerical representation of color may be used and expressed as a function of distance.

In some alternative embodiments, the model of color variation as a function of distance may be empirically determined. For example, where the distance between the two reflective layers in an interferometric modulator can be independently determined, experimental measurements of color parameters may then be related to the known distances.

Figure 9:
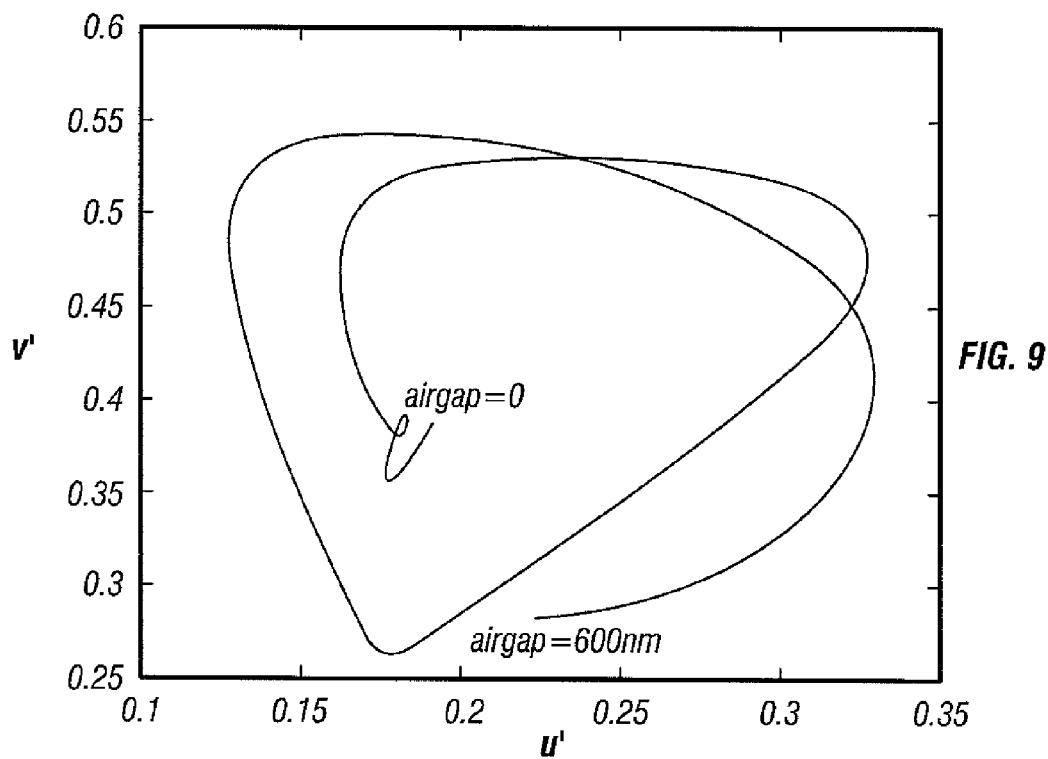
FIG. 9 is a color space plot showing a color spiral model of distances between reflective layers in an interferometric modulator.

The model produced according to the above process may consist of a series of color parameter values related to a series of distances. These values may be stored on a computer readable medium for use in algorithms that determine distances from colors in a photograph of an interferometric modulator (e.g., according to the process described in blocks 110-130 in FIG. 8). In some embodiments, the model may be depicted as a "color spiral" in a color space plot. For example, FIG. 9 is a u'-v' color space plot where color parameters that have been determined using an optical model algorithm have been plotted over a range of distance of 0 nm to 600 nm between the two reflective layers in an interferometric modulator. As the distance is varied, the u'-v' color parameters follow a path through the color space. The resulting color spiral represents all of the u'-v' colors that are available to be reflected from a particular interferometric modulator.

As noted above, one embodiment includes acquiring digital photographs of interferometric modulators and using the models described above to determine distances between reflective layers based on the colors in the photographs. Accordingly, in one embodiment, a test station is provided that includes a digital photograph acquisition system configured to illuminate and acquire the digital photographs. The test station may include a computer configured to receive the digital photographs in order to determine and compare color parameters in the photograph to a model described above. The computer may also be configured to generate a two-dimensional spatial map and perform statistical analyses on the results.

Figure 10:
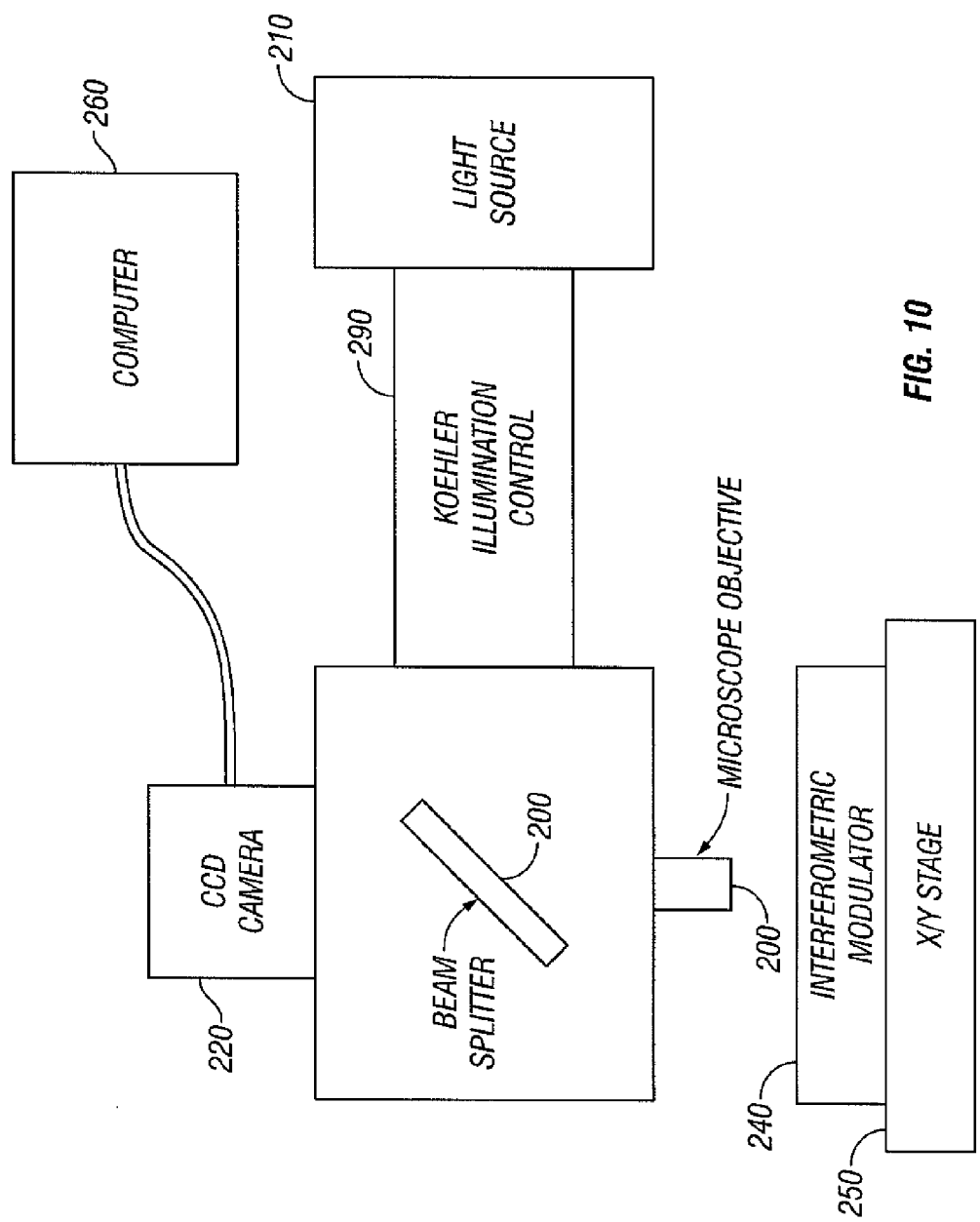
FIG. 10 is a block diagram illustrating a test station for illuminating and photographing an interferometric modulator.

Because interferometric modulators exhibit specular reflectance, one embodiment of a test station includes using an in-line lighting system for acquiring the digital photographs. For example, in one embodiment, depicted in FIG. 10 a beam splitter 200 is provided that reflects light from a light source 210 onto an interferometric modulator array 240, which may be coupled to an X-Y stage 250. The X-Y stage 250 may be used to move the interferometric modulator array 240 in order to select a region for illumination and photographing. A CCD camera 220 or other suitable digital camera is provided for photographing the interferometric modulator array 240. In this way, both the incident and the detected reflected light is normal to the interferometric modulator array 240. The CCD camera 220 may be coupled to a computer 260 for evaluation of digital photographs taken by the CCD camera 220. In some embodiments, the CCD camera 220 is white balanced prior to image acquisition. For example, a spectrally reflective aluminum white standard may be used for white balancing. In some embodiments, the system may additionally comprise a microscope objective 230 for evaluating only a small portion of the total active surface area of the interferometric modulator array 240.

The light source 210 may be chosen to provide light having a desired spectral and intensity characteristics. For example, it may be desirable to have the light source 210 approximate the characteristics of the light source that will typically be used to view an interferometric modulator display. In one embodiment, a standard D65 light source is used.

In some embodiments, the light source 210 may be coupled to an illumination control device 290, such as a device having a Koehler design. The aperture of the illumination control device 290 may be adjusted to illuminate only the area of interest on the interferometric modulator array 240.

Although a particular test station has been described, those of skill in the art will recognize that any suitable in-line illumination and detection system may be utilized to acquire digital photographs for use as described herein.

When measuring light reflected from an interferometric modulator using the in-line lighting systems described above, the size of area of illumination and photographing may be controlled using a system of lenses and apertures, such as in the Koehler device 290 with lens 230, or other aperture-lens system. The light may be controlled both before and/or after reflection from the interferometric modulators.

Those of skill in the art will appreciate other methods for providing in-line illumination and detection of light reflected from interferometric modulators. In one alternative embodiment, non-inline specular reflectance is detected. For example, the camera may be positioned at any angle relative to an interferometric modulator array where light rays from the light source make the same angle from an opposite direction. In another embodiment, a diffuser film is placed over the interferometric modulators such that non-specular reflectance is observed, eliminating the need for careful alignment of light source and camera angle.

In some embodiments, multiple interferometric modulators are imaged in a single photograph. Single interferometric modulators in the photograph may then be mapped by first identifying the appropriate region within the photograph corresponding to light reflected from the desired interferometric modulator. For example, a user may manually select the region for spatial mapping on a computer by drawing a rectangle or other shape to define the perimeter of the region (e.g., corresponding to a single interferometric modulator) to be mapped. Alternatively, an algorithm may be provided that automatically identifies the borders of individual interferometric modulators by detecting the sudden decrease in reflectance at the border of the interferometric modulators. In some embodiments, a spatial map is determined for all complete interferometric modulators appearing in a single photograph. In other embodiments, less than all of the interferometric modulators in the photograph are evaluated. In one embodiment, only a single interferometric modulator is evaluated. In some embodiments, multiple photographs are acquired from different regions of an array of interferometric modulators (e.g., a display). In some embodiments, a sampling of interferometric modulators in an array are spatially mapped. Evaluating multiple interferometric modulators across an array provides an indication of uniformity of interferometric modulator structure across the array. Statistical analyses on the resulting spatial maps may be performed to provide an indication of variation in the spatial maps of the interferometric modulators in the array.

Although the systems described above utilize digital cameras, those of skill in the art will appreciate that other methods may be utilized for acquiring photographs. For example, the interferometric modulators may be photographed using film-based cameras. The developed pictures may then be scanned into digital form for processing.

Once a photograph of one or more interferometric modulators is acquired and a region corresponding to a selected interferometric modulator within the photograph defined, a computer algorithm may be applied that determines the color (e.g., by determining u'-v' color parameters) in the selected region as a function of two-dimensional position. In some embodiments, the color of each photograph pixel in the selected region is determined. In this fashion, the entire surface area of the interferometric modulator is evaluated. In other embodiments, average colors within sub-regions of the photograph are determined. In still other embodiments, a sampling of pixels or regions within the selected region is evaluated.

Figure 11:
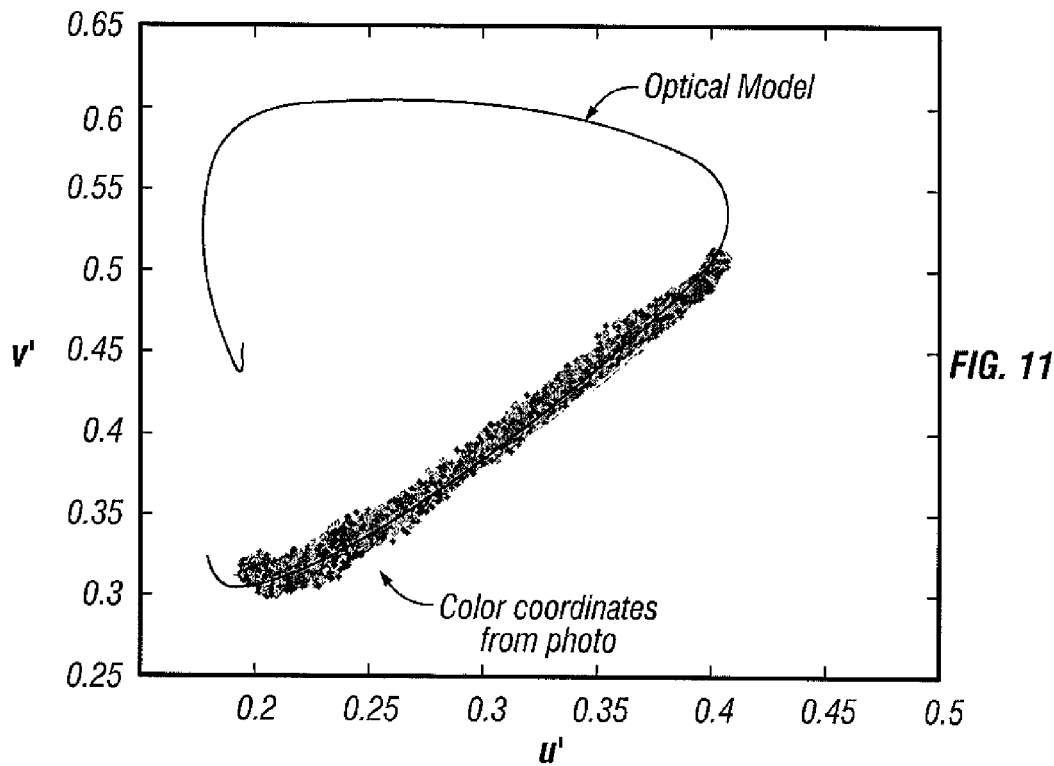
FIG. 11 is color space plot showing color parameters obtained from a digital photograph of an interferometric modulator and showing a color spiral model of distances between reflective layers in the interferometric modulator.

The determined color parameters are next compared to the model described above to determine the distance between reflective layers for each two-dimensional position evaluated. In one embodiment, the color parameters for each position (e.g., each pixel in the photographic region evaluated) are used to plot the colors of the positions on a color space plot that also contains the color spiral described above. FIG. 11 depicts a resulting color space plot containing the plotted colors for all two-dimensional positions for which color parameters have been determined (e.g., all pixels in a photograph of an interferometric modulator) along with the color spiral model. The reflective layer distance corresponding to each plotted color may be determined by finding the point on the color spiral that is the closest in the color space to the plotted measurement. For example, in one embodiment, a minimization algorithm is used to locate the point on the color spiral that minimizes a line between the color spiral and the plotted measurement. The reflective layer distance associated with that point on the color spiral is chosen as the determined distance between the two reflective layers in the interferometric layer at the two-dimensional position corresponding to the plotted measurement.

Figure 12:
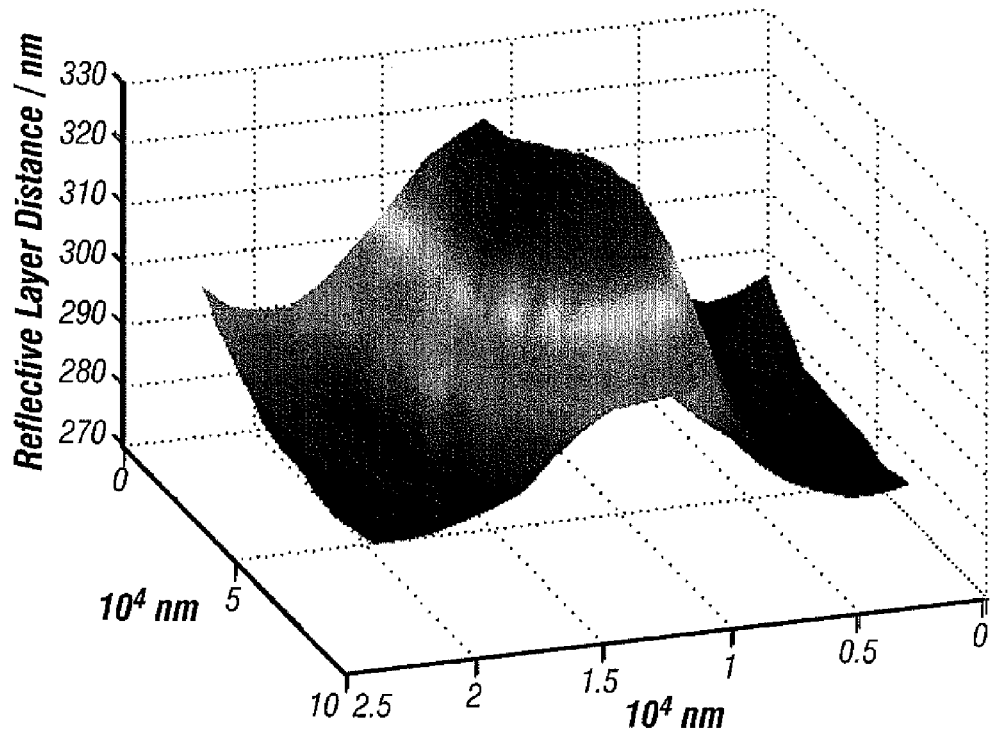
FIG. 12 is a surface map showing reflective layer distances over a two-dimensional spatial map of an interferometric modulator.

Once all of the two-dimensional positions are evaluated, the determined reflective layer distance as a function of two-dimensional position may be displayed to a user or further evaluated. In one embodiment, the results are displayed as a two-dimensional spatial map to the user. For example, the results may be displayed as a contour plot or a surface plot. FIG. 12 depicts an exemplary surface plot showing the variation of reflective layer distance as a function of position within an interferometric modulator (note that the vertical distance coordinate has been stretched relative to the other coordinates so that the variation can more easily be observed). In addition, statistical analyses may be performed on the data set represented in the maps. For example, the minimum, maximum, average, and median distances may be determined. In addition, an overall tilt or orientation in the variation of distance may be determined. Such a determination is indicative of the tilt or orientation of the reflective layers in the interferometric modulator. These statistical parameters may in turn be compared to similar parameters for other interferometric modulators in the same array and/or other arrays to obtain overall statistical measures such as the distribution of the minimum, maximum, average, and median across an array or series of arrays. These statistical measures can provide an indication of manufacturing defects within a single array or series of arrays. In addition, the parameters can be used to modify and improve manufacturing processes to obtain a desired result.

In some embodiments, an automated system may be provided that measures reflective layer distances as described above for a plurality of interferometric modulators in interferometric modulator displays produced in a large-scale manufacturing process. The system may provide an alert when greater than a threshold number of interferometric modulators in a display are determined to have reflective layer variation that fall out of a predetermined specification. Accordingly, the system may be used in a quality control process to automatically identify defective displays.

Although the invention has been described with reference to embodiments and examples, it should be understood that numerous and various modifications can be made without departing from the spirit of the invention. Accordingly, the invention is limited only by the following claims.

What is claimed is:

1. A method comprising:
    determining, in an electronic device, color parameters for light reflected from a particular location of an interferometer having a first reflective surface and a second reflective surface parallel to the first reflective surface; and
    determining, in the electronic device, an estimated distance between the first and second reflective surfaces at the particular location by comparing the determined color parameters with a model stored in a memory.

2. The method of claim 1, wherein the interferometer is an interferometric modulator.

3. The method of claim 1, further comprising repeating the method for a plurality of particular locations of the interferometer.

4. The method of claim 3, further comprising displaying a two-dimensional map of distances between the first and second reflective surfaces as a function of location of the interferometer.

5. The method of claim 3, further comprising determining a tilt, orientation, or curvature of at least one reflective surface of the interferometer.

6. The method of claim 1, further comprising providing an indication of manufacturing defect based at least on the estimated distance.

7. The method of claim 1, further comprising repeating the method for a plurality of interferometers in an array.

8. The method of claim 7, further comprising determining statistical parameters for the plurality of interferometers.

9. The method of claim 8, further comprising providing an indication of manufacturing defect based at least on the determined statistical parameters.

10. A computer-readable medium comprising code which, when executed, causes a processor to perform a method comprising:
   determining color parameters for light reflected from a particular location of an interferometer having a first reflective surface and a second reflective surface parallel to the first reflective surface; and
   determining an estimated distance between the first and second reflective surfaces at the particular location by comparing the determined color parameters with a model.

11. The computer-readable medium of claim 10, wherein the method further comprises deriving the model based on one or more properties of one or more materials in the interferometer, the properties selected from the group consisting of index of refraction, extinction coefficient, and thickness.

12. The computer-readable medium of claim 10, wherein the method further comprises repeating the method for a plurality of interferometers in an array.

13. The computer-readable medium of claim 12, wherein the method further comprises determining statistical parameters for the plurality of interferometers.

14. The computer-readable medium of claim 13, wherein the method further comprises providing an indication of manufacturing defect based at least on the determined statistical parameters.

* * * * *

UNITED STATES PATENT AND TRADEMARK OFFICE
CERTIFICATE OF CORRECTION

| | | |
|---|---|---|
| PATENT NO. | : 7,688,452 B2 | Page 1 of 1 |
| APPLICATION NO. | : 12/116704 | |
| DATED | : March 30, 2010 | |
| INVENTOR(S) | : Kostadin Djordjev | |

It is certified that error appears in the above-identified patent and that said Letters Patent is hereby corrected as shown below:

At col. 12, line 29, change "spectrally" to --specularly--.

Signed and Sealed this
Twenty-eighth Day of December, 2010

David J. Kappos
*Director of the United States Patent and Trademark Office*